United States Patent
Xie et al.

(10) Patent No.: US 9,632,668 B2
(45) Date of Patent: Apr. 25, 2017

(54) REVERSE COVERAGE HEAT MAP

(71) Applicant: Aruba Networks, Inc., Sunnyvale, CA (US)

(72) Inventors: Jin Xie, Sunnyvale, CA (US); Jiwoong Lee, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 177 days.

(21) Appl. No.: 14/528,247

(22) Filed: Oct. 30, 2014

(65) Prior Publication Data

US 2016/0127926 A1   May 5, 2016

(51) Int. Cl.
*H04B 17/00*     (2015.01)
*G06F 3/0484*    (2013.01)
*H04W 16/22*     (2009.01)

(52) U.S. Cl.
CPC .......... *G06F 3/0484* (2013.01); *H04W 16/22* (2013.01)

(58) Field of Classification Search
CPC ... H04W 52/225; H04W 24/08; H04W 64/00; G06F 3/0484
USPC ...................................................... 455/67.7
See application file for complete search history.

(56) References Cited

U.S. PATENT DOCUMENTS

| | | | |
|---|---|---|---|
| 8,767,695 B2* | 7/2014 | Sheriff ................. | H04W 36/30 370/328 |
| 2009/0005064 A1* | 1/2009 | Malik .................. | H04W 64/00 455/456.1 |
| 2014/0003342 A1* | 1/2014 | Sheriff ................. | H04W 76/02 370/328 |
| 2015/0080019 A1* | 3/2015 | Edge ..................... | G01S 5/0236 455/456.1 |
| 2016/0173195 A1* | 6/2016 | Nielsen .................... | H04B 3/50 398/1 |

* cited by examiner

*Primary Examiner* — Ajibola Akinyemi
(74) *Attorney, Agent, or Firm* — Brooks, Cameron & Huebsch, PLLC

(57) ABSTRACT

A non-transitory computer readable medium for storing instructions is disclosed. The instructions, when executed by one or more hardware processors, causes performance of operations including (i) for a plurality of wireless signals received by a first access point located in a physical environment, determining (a) a corresponding plurality of received signal strength values and (b) a corresponding plurality of locations from where the plurality of wireless signals were transmitted, and (ii) generating a reverse heat map for the physical environment such that a plurality of zones in the reverse heat map are defined based on (a) the corresponding plurality of received signal strength values and (b) the corresponding plurality of locations determined for the plurality of wireless signals.

19 Claims, 6 Drawing Sheets

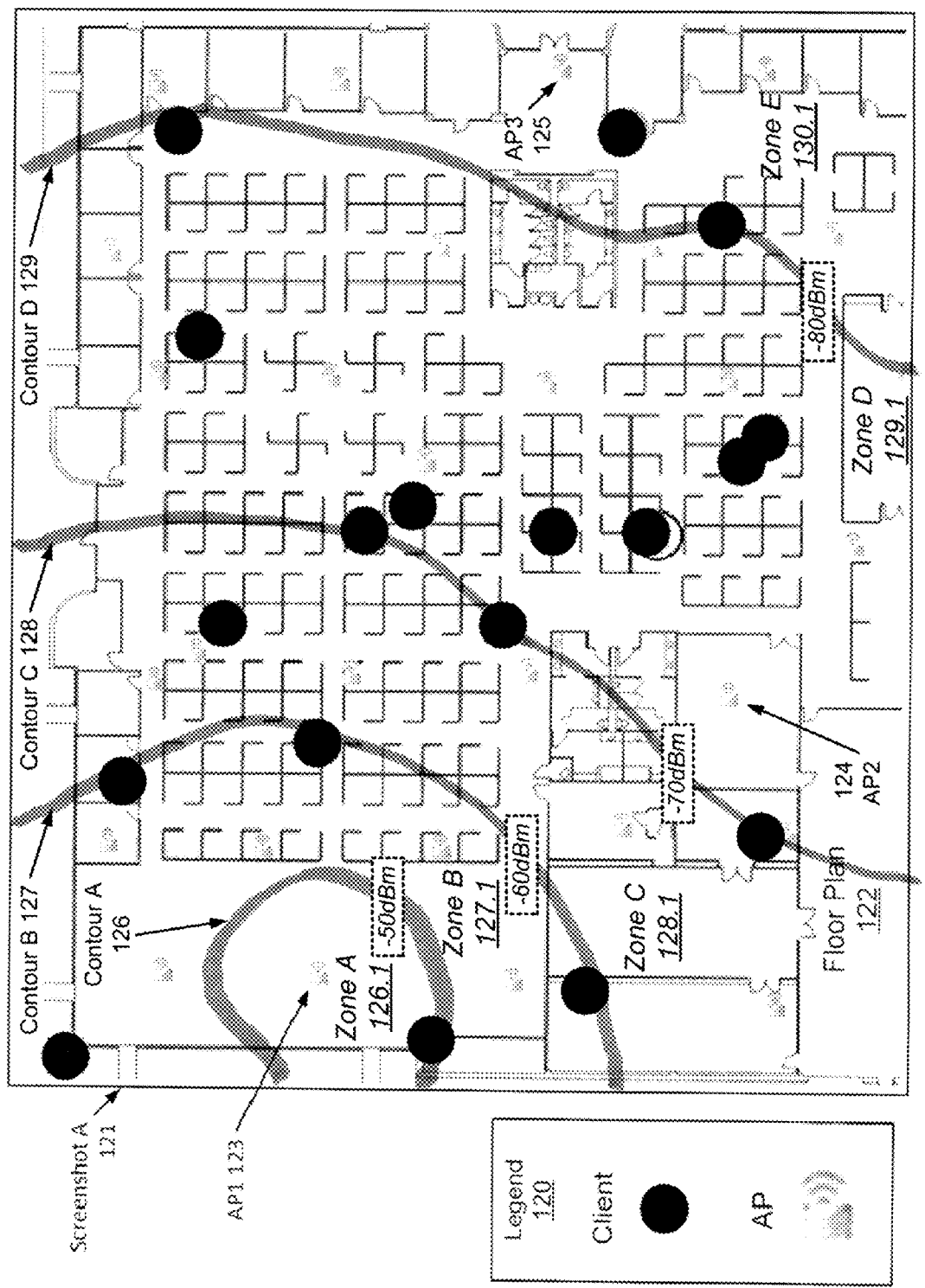
FIG. 3.1

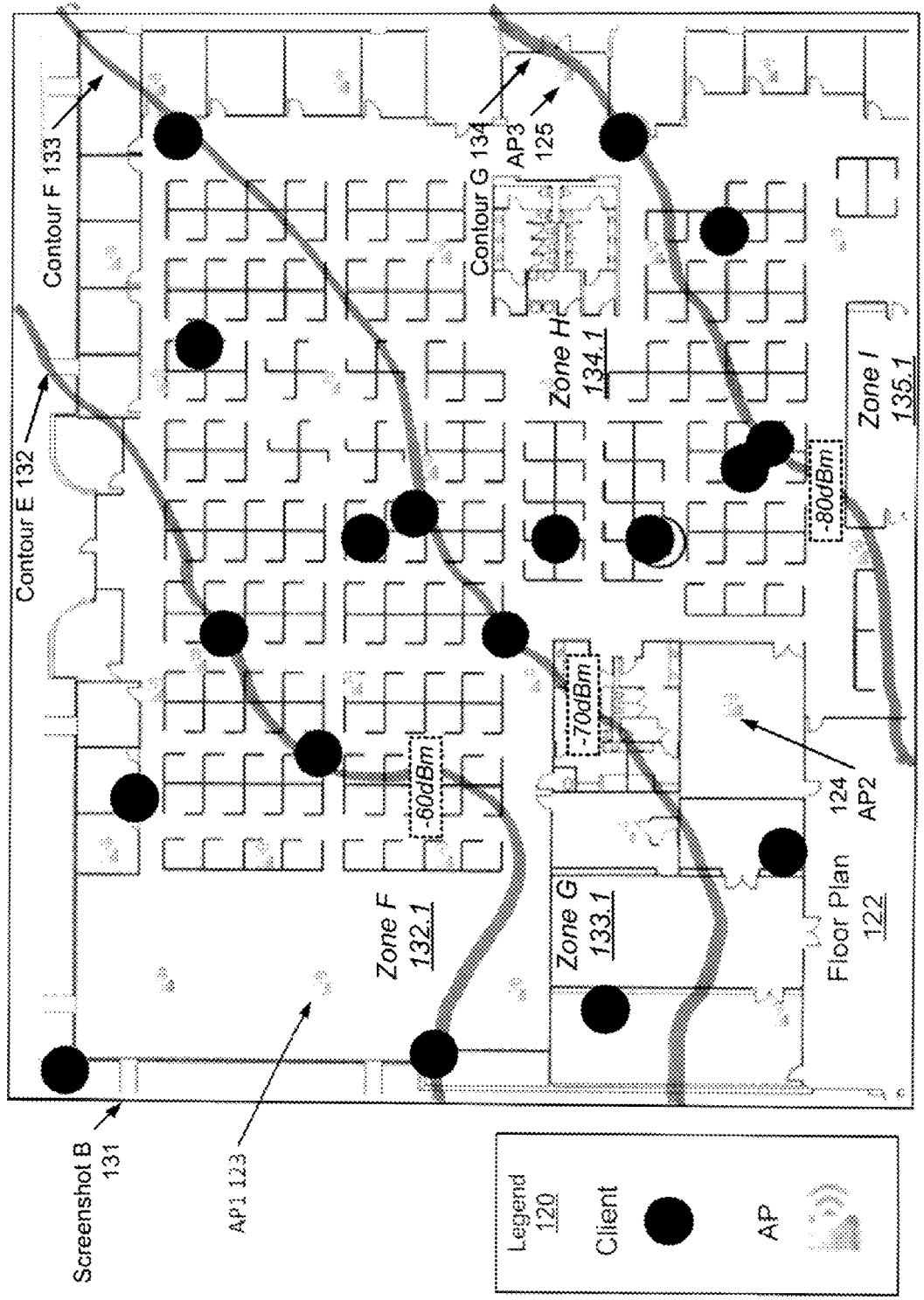
FIG. 3.2

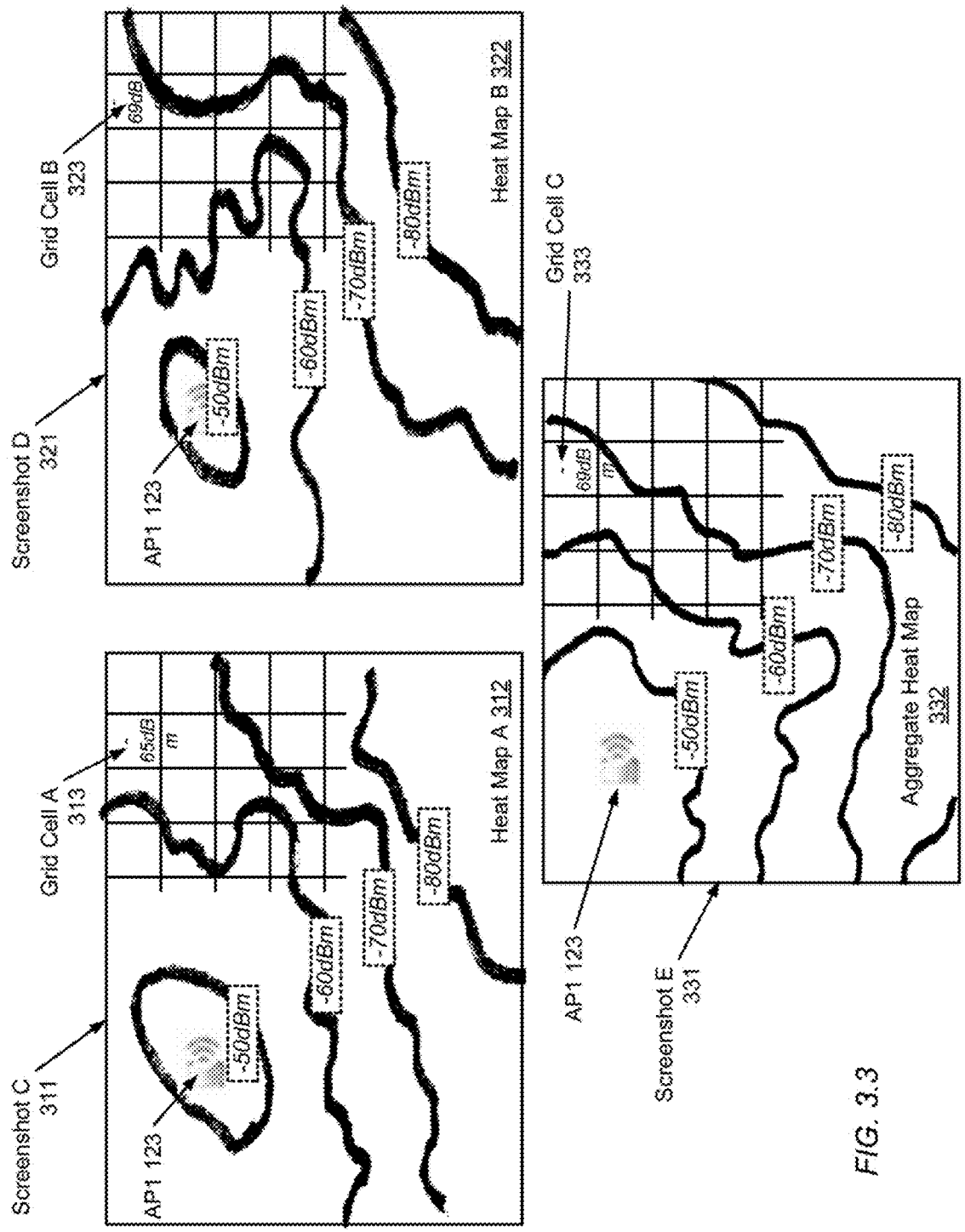
FIG. 3.3

REVERSE COVERAGE HEAT MAP

BACKGROUND

A wireless network transmits data packets using wireless signals based on electromagnetic waves, such as RF (radio frequency) signals. Wireless network diagnosis often requires determination if the wireless signal issues for a given device is caused by an access point (AP) via which the device accesses the wireless network, the floor plan where the AP and the device are located, or the device itself. In particular, the floor plan is a drawing showing relationships between physical features of a space or environment, such as devices and APs located on one level of an office building. Specifically, each point on the floor plan corresponds to a physical location in the space or environment.

Wireless signal attenuation, or path loss includes propagation losses caused by the natural expansion of the electromagnetic wave front in free space, absorption losses when the wireless signal passes through media not transparent to electromagnetic waves, diffraction losses when part of the electromagnetic wave front is obstructed by an opaque obstacle, and losses caused by other phenomena. For example, the wireless signal radiated by a transmitter may also travel simultaneously along many and different paths to a receiver; this effect is referred to as multipath. Multi path electromagnetic waves combine at the receiver antenna, resulting in a received signal that may vary widely, depending on the distribution of the intensity and relative propagation time of the electromagnetic waves and bandwidth of the transmitted wireless signal.

OVERVIEW

In general, in one aspect, the invention relates to a non-transitory computer readable medium. The non-transitory computer readable medium stores instructions which, when executed by one or more hardware processors, causes performance of operations including (i) for a plurality of wireless signals received by a first access point located in a physical environment, determining (a) a corresponding plurality of received signal strength values and (b) a corresponding plurality of locations from where the plurality of wireless signals were transmitted, and (ii) generating a reverse heat map for the physical environment such that a plurality of zones in the reverse heat map are defined based on (a) the corresponding plurality of received signal strength values and (b) the corresponding plurality of locations determined for the plurality of wireless signals.

In general, in one aspect, the invention relates to a non-transitory computer readable medium. The non-transitory computer readable medium stores instructions which, when executed by one or more hardware processors, causes performance of operations including (i) for a plurality of wireless signals received by a first access point located in a physical environment, determining (a) a corresponding plurality of received signal strength values and (b) a corresponding plurality of locations from where the plurality of wireless signals were transmitted, and (ii) generating a reverse heat map, based on the determining, and for the physical environment, estimating a mapping between (a) locations in the physical environment and (b) an estimate of received signal strength values for wireless signals transmitted from the respective locations in the physical environment and received at the first access point.

In general, in one aspect, the invention relates to a graphical user interface (GUI). The GUI includes a heat map of a physical environment, where the heat map includes a representation of a first access point (AP) in the physical environment, and a plurality of zones, each zone being defined by at least two contours. The at least two contours include a first contour corresponding to a first received signal strength value, and a second contour corresponding to a second received signal strength value, where the first contour is determined using at least a first location of a transmitting device, in the physical environment, that transmitted a first wireless signals which was received by the first AP at the first received signal strength value.

Other aspects will be apparent from the following description and the appended claims.

BRIEF DESCRIPTION OF DRAWINGS

FIGS. 3.1-3.3 show examples in accordance with one or more embodiments.

DETAILED DESCRIPTION

Figure 1:
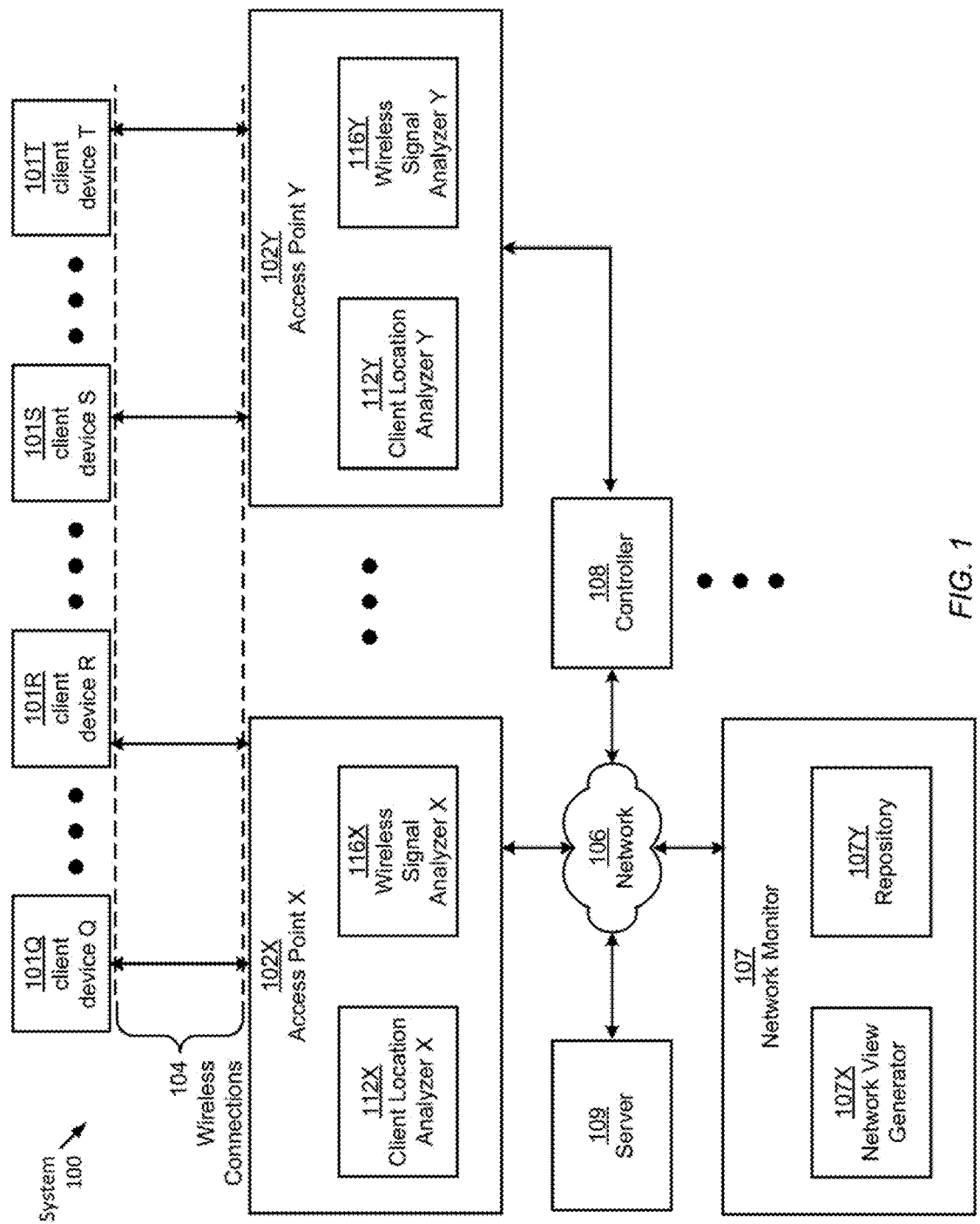
FIG. 1 shows a system in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a method, system, and computer readable medium for visualizing RF signal coverage in a physical environment. In one or more embodiments, a reverse heat map (RCH) is generated for the physical environment. While a forward heat map (FCH) is an areal plot (e.g., two-dimensional (2D) areal plot) of received signal strength values of wireless signals transmitted by a single AP, the RCH is an areal plot of received signal strength values of wireless signals transmitted by multiple transmitting devices that are received by a single AP. In particular, an areal plot is a graphical representation of data with respect to multiple spatial (or optional temporal) dimensions. For example, a 2D areal plot may correspond to a 2D floor plan, a 3D areal plot may correspond to a 3D office space, and a 4D areal plot may correspond to a 3D office space with a fourth temporal dimension. In one or more embodiments, zones in the RCH are defined based on (a) received signal strength values of wireless signals received by the single AP and (b) corresponding locations from which the wireless signals are transmitted within the physical environment.

FIG. 1 shows a schematic diagram of a system (100) in accordance with one or more embodiments. As shown in FIG. 1, the system includes client devices (e.g., client device Q (101Q), client device R (101R), client device S (101S), client device T (101T)), APs (e.g., AP X (102X), AP Y (102Y)), a network (106), a network monitor (107), a controller (108), and as server (109). In one or more embodiments, the client devices and the APs are located in a physical environment (e.g., a floor of an office building) represented by a floor plan. Each of these components is discussed below in accordance with one or more embodiments.

In one or more embodiments, a client device (e.g., client device Q (101Q), client device R (101R), client device S (101S), client device T (101T)) is a hardware component that receives a service from the server (109) or other resources via the network (106). In one or more embodiments, a client device (e.g., client device Q (101Q), client device R (101R), client device S (101S), client device T (101T)) may be one or more mobile devices (e.g., laptop computer, smart phone, personal digital assistant, tablet computer, or other mobile device), gaming console, desktop computers, servers, blades in a server chassis, or any other type of electronic device or devices that includes at least the minimum processing power, memory, and input and output device(s) to perform one or more embodiments. For example, the device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. The device may also include one or more input device(s), such as a touchscreen, keyboard, mouse, microphone, touchpad, electronic pen, or any other type of input device. Further, the device may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely (e.g., via the network) connected to the hardware processor(s), memory, and storage device(s). Many different types of devices exist, and the aforementioned input and output device(s) may take other forms.

The client device may be connected to a network (106) via a network interface connection (not shown) and an AP (e.g., AP X (102X), AP Y (102Y)). The network (106) may be a local area network (LAN), a wide area network (WAN) such as the Internet, mobile network, or any other type of network, or a combination of networks. The client device that connects to the network (106) via a particular AP is referred to as connected to the AP. Typically, the client device may be within wireless signal range of multiple APs but connects to a single AP at any particular time.

An AP (e.g., AP X (102X), AP Y (102Y)) is a digital hardware device that may be communicatively coupled to the network (106). The AP (e.g., AP X (102X), AP Y (102Y)) is a separate hardware unit from a client device (e.g., client device Q (101Q), client device R (101R), client device S (101S), client device T (101T)), that is directly and wirelessly connected to the client device, and is in a communication path from the client device to the network. In other words, the AP may be directly connected via the direct wireless connection (104) to a network interface card on the client device (e.g., client device Q (101Q), client device R (101R), client device S (101S), client device T (101T)). The APs include functionality to transmit and receive packets (discussed below) via the network (106) and wireless connection (104). By way of an example, the AP may include a wireless AP (WAP) that communicates wirelessly with client devices using Wi-Fi, Bluetooth, or related standards. Further, APs may be directly connected to the network (106) or connected via a controller (e.g., controller (108)). For example, the controller (108) is a digital hardware device that manages aspects (e.g., sharing and storage of state information) of one or more APs connected to the controller (108).

Each AP may be connected to any number of client devices at any moment in time. Specifically, each AP may be connected to no client devices, a single client device, or multiple client devices at any particular moment in time. Further, the number of client devices connected to an AP may be heterogeneous amongst APs.

In one or more embodiments, an AP (e.g., AP X (102X), AP Y (102Y)) includes a client location analyzer (e.g., client location analyzer X (112X), client location analyzer Y (112Y)) and a wireless signal analyzer (e.g., wireless signal analyzer X (116X), wireless signal analyzer Y (116Y)). Although not explicitly shown, each AP may also includes one or more hardware processors and memory storing software instructions to perform the functionalities of the client location analyzer and wireless signal analyzer. In one or more embodiments, the wireless signal analyzers are configured to analyze wireless signals (e.g., Wi-Fi signals, Bluetooth signals, etc.) received by the respective APs. For example, the wireless signal analyzer X (116X) determines strengths of wireless signals, as received by the AP X (102X), that are transmitted by one or more client devices (e.g., client device Q (101Q), client device R (101R)) and/or one or more APs (e.g., AP Y (102Y)), In this context, the client devices and/or APs transmitting the wireless signals to the AP X (102X) are referred to as the transmitting devices with respect to the AP X (102X). Specifically, a wireless signal is a wireless transmission of electromagnetic signals through the atmosphere or free space. Packet data (e.g., Wi-Fi data, Bluetooth data, etc.) is carried by modulating certain property (e.g., amplitude, frequency, phase, or pulse width) of the wireless signals. Magnitudes of the amplitude or other modulated property of wireless signals may be measured by the wireless signal analyzers to represent the strengths of wireless signals. The measured magnitude or other modulated property of wireless signals are referred to as received signal strength values. In one or more embodiments, the received signal strength values are measured by the wireless signal analyzer X (116X) according to a pre-determined schedule (e.g., hourly, daily, weekly, monthly, or other recurring schedule) or triggered by a pre-determined event or a user input.

In one or more embodiments, each received signal strength value may be normalized, e.g., as a ratio based on comparison of received wireless signal strength to transmission power of the corresponding transmitting device. Accordingly, the received signal strength values of wireless signals transmitted by different types of transmitting devices may be compared and/or aggregated. For example, the normalized received signal strength values may be represented as an attenuation factor in units of decibel (dB), while the received signal strength values may be represented in units of decibel milli-watt (dBm). In one or more embodiments, the attenuation factor may be increasing with the distance between the AP and associated transmitting devices. In addition, the attenuation factor may be further modified by environmental factors such as a signal degradation from RF absorbing objects blocking the paths from the AP to the associated transmitting devices. In one or more embodiments, the received signal strength values are indexed by transmitting device identifiers and provided to the network monitor (107) for storing in the repository (107Y). Further, each collection of received signal strength values, as determined by a corresponding AP, is indexed by an identifier of the AP.

In one or more embodiments, client location analyzers (e.g., client location analyzer X (112X), client location analyzer Y (112Y)) in multiple APs collectively collect information (e.g., signal strength associated with each client device) to determine the locations of the client devices. In one or more embodiments, determining a location for a client device is based on information from the AP to which the client device is connected. The determination of the location may also be made based on information from other APs within range of the client device. In one or more embodiments, the client location analyzers provide the information from multiple APs to a central client location analyzer to determine the location of each client device. The central client location analyzer may be one of the client location analyzers included in the APs or located on other network nodes, such as located on a controller (e.g., controller (108)) or the computer server (109). In one or more embodiments, the client device locations are indexed by client device identifiers and provided to the network monitor (107).

Continuing with FIG. 1, the network monitor (107) includes a network view generator (107X) and a repository (107Y). In one or more embodiments, the repository (107Y) stores the transmitting device locations and received signal strength values that are obtained from the APs, or otherwise generated based on information obtained from the APs. In one or more embodiments, the network view generator (107X) generates a network view as part of a graphical user interface (GUI) of the network monitor (107). Specifically, the network view presents a floor plan to a user (e.g., a network administrator) of the network monitor (107) to visualize received signal strength values of the transmitting devices. In particular, the network view provides visual guidance on device purchase planning, deployment planning, channel/transmission power planning, and/or interference mitigation. Examples of the network view are described in reference to FIGS. 3.1-3.3 below.

In one or more embodiments, the network view includes a forward coverage heat map (FCH, also referred to as forward heat map), which is an areal plot of received signal strength values of wireless signals transmitted by a single AP in a corresponding physical environment. In one or more embodiments, the FCH includes both directly measured received signal strength values and estimated received signal strength values that are interpolated/extrapolated from the directly measured received signal strength values. In one or more embodiments, the estimated received signal strength values are estimated based on a simplified path-loss model that estimates propagation losses, and further interpolated/extrapolated based on the directly measured received signal strength values to account for other path loss contributions, such as absorption losses, diffraction losses, and multipath effects.

In one or more embodiments, the FCH includes contours dividing the areal plot into multiple zones. Specifically, each zone is bounded by two contours and the points of each contour represent locations in the physical environment where wireless signals transmitted by the single AP have the same received signal strength value. In other words, for a particular contour, the wireless signals transmitted by the single AP have the same received signal strength value when measured at corresponding physical locations of the particular contour. In one or more embodiments, the received signal strength values in the FCH are measured by client devices or neighboring APs in the physical environment, and/or estimated (e.g., interpolated, extrapolated, or otherwise derived) from measurements by the client devices. An example of the FCH is described in reference to FIG. 3.1 below.

FIG. 3.1 shows a screenshot A (121) of an example FCH showing received signal strength values of wireless signals transmitted from the AP1 (123). As shown in FIG. 3.1, the FCH includes the contour A (126), contour B (127), contour C (128), and contour D (129) that divide a floor plan (122) into five zones, namely zone A (126.1), zone 13 (127.1), zone C (128.1), zone D (129.1), and zone E (130.1). The floor plan (122) represents a single floor of an office (i.e., the physical environment). Specifically, the floor plan (122) includes APs and client devices that, are represented by the AP icon and the client icon according to the legend (120). In one or more embodiments, at least a portion of the client icons in the FCH represent multiple client devices in the office. In one or more embodiments, at least a portion of the client icons in the FCH represent a single client device that is moved to different locations in the office at different time points. Certain received signal strength values in the FCH, where client icons are shown, are based on measurements by one or more client devices at the corresponding physical locations. Other received signal strength values in the FCH, where client icons are not present, are interpolate/extrapolated based on measurements by the client devices.

The contours in the FCH are annotated with received signal strength values. Specifically, the contour A (126) includes points having the same received signal strength value of −50 dBm, the contour B (127) includes points having the same received signal strength value of −60 dBm, the contour C (128) includes points having the same received signal strength value of −70 dBm, and the contour D (129) includes points having the same received signal strength value of −80 dBm. Accordingly, each point in the zone A (126.1) has a received signal strength value greater than or equal to −50 dBm, each point in the zone B (127.1) has a received signal strength value between −50 dBm and −60 dBm, each point in the zone C (128.1) has a received signal strength value between −60 dBm and −70 dBm, each point in the zone D (129.1) has a received signal strength value between −70 dBm and −80 dBm, and each point in the zone F (130.1) has a received signal strength value less than −80 dBm. As noted above, the received signal strength values in the FCH include measurements by the client devices that are connected to the AP1 (123). In addition, the received signal strength values in those portions of the ECU where there are no client devices are derived (e.g., interpolated, extrapolated, etc.) from measurements by the client devices connected to the AP (123), or otherwise capable of receiving wireless signals from the AP1 (123). In one or more embodiments, the received signal strength values in the FCH may also include measurements by other APs, such as the AP2 (124) and/or AP3 (125). In the example shown in FIG. 3.1, the zones are defined by solid curves representing the contours in the FCH, where the received signal strength values are not explicitly shown in the zones. In one or more embodiments, the received signal strength values in each zone are shown using pre-defined colors or pre-defined patterns, where the contours correspond to iso-color or iso-pattern curves in the FCH. Although the contours in the FCH described above are annotated with received signal strength values, the contours may also be annotated using normalized received signal strength values.

In one or more embodiments, the FCH estimates wireless signal coverage of the forward data link, corresponding to transmission from the AP to connected client devices. However, the FCH does not directly help in addressing improper power planning of the client devices, resulting in one-way traffic issues such as uni-directional voice issues for VoIP applications and other anomalous client device behaviors. A combination of FCH and reverse coverage heat map (RCH, also referred to as reverse heat map) addresses the bi-directional nature of the wireless data communication. The RCH is a an areal plot of received signal strength values of wireless signals transmitted by multiple transmitting devices (or a single transmitting device placed at multiple locations at different time) in a physical environment that are received by a single AP. In one or more embodiments, the RCH includes contours dividing the areal plot into multiple zones. Specifically, each zone is bounded by two contours, and the points of each contour represent locations in the physical environment from which wireless signals transmitted by a transmitting device would have the same received signal strength values as measured by the single AP. In other words, for a particular contour, the wireless signal received by the single AP would have the same received signal strength value if transmitted from any corresponding physical location of the particular contour. In one or more embodiments, the received signal strength values in the RCH are based on measurements of wireless signals transmitted from client devices or other APs in the physical environment, and/or estimated (e.g., interpolated, extrapolated, or otherwise derived) from the measurements. An example of the RCH is described in reference to FIG. 3.2 below. In particular, the FCH shown in FIG. 3.1 and the RCH shown in FIG. 3.2 are for the same physical environment represented by the same floor plan (122) described above. In other words, the FCH shown in FIG. 3.1 and the RCM shown in FIG. 3.2 are based on the same locations and configurations of APs and client devices.

FIG. 3.2 shows a screenshot B (131) of an example RCH showing received signal strength values, as measured by the AP1 (123), of wireless signals that are transmitted from locations throughout the physical environment. As shown in FIG. 3.2, the FCH includes the contour E (132), contour F (133), and contour G (134) that divide the floor plan (122) into four zones, namely zone F (132.1), zone G (133.1), zone H (134.1), and zone I (135.1). In one or more embodiments, at least a portion of the client icons in the RCH represent multiple client devices in the office. In one or more embodiments, at least a portion of the client icons in the RCH represent a single client device that is moved to different locations in the office at different time points. Certain received signal strength values in the RCH, where client icons are shown, are based on measurements by AP1 (123) of wireless signals transmitted from one or more client devices at the corresponding physical locations. Other received signal strength values in the RCH, where client icons are not present, are interpolated/extrapolated based on the measurements. In other words, the RCH includes both directly measured received signal strength values and estimated received signal strength values that are interpolated/extrapolated from the directly measured received signal strength values.

The contours in the RCH are annotated with received signal strength values. Specifically, the contour E (132) includes points having the same received signal strength value of −60 dBm, the contour F (133) includes points having the same received signal strength value of −70 dBm, and the contour G (134) includes points having the same received signal strength value of −80 dBm. Accordingly, each point in the zone F (1132.1) has a received signal strength value between greater than or equal to −60 dBm, each point in the zone G (133.1) has a received signal strength value between −60 dBm and −70 dBm, each point in the zone H (134.1) has a received signal strength value between −70 dBm and −80 dBm, each point in the zone I (135.1) has a received, signal strength value less than −80 dBm. As noted above, the received signal strength values in the RCH include measurements of wireless signals transmitted from the client devices. In addition, the received signal strength values in those portions of the RCH where there are no client devices are derived (e.g., interpolated, extrapolated, etc.) from the measurements of wireless signals transmitted from the client devices connected to the AP1 (123). In one or more embodiments, the received signal strength values in the RCH may also include measurements, by the AP1 (123), of wireless signals transmitted from other APs, such as the AP2 (124) and/or AP3 (125). In the example shown in FIG. 3.2, the zones are defined by solid curves representing the contours in the RCH, where the received signal strength values are not explicitly shown in the zones. In one or more embodiments, the received signal strength values may be shown in selected points of each zone using a number, a percentage, a letter grade, or other suitable representation. In one or more embodiments, the received signal strength values in each zone are shown using pre-defined colors or pre-defined patterns, where the contours correspond to iso-color or iso-pattern curves in the RCH. Although the contours in the RCH described above are annotated with received signal strength values, the contours may also be annotated using normalized received signal strength values.

Returning to the discussion of FIG. 1, based on the network view presented to the user (e.g., a network administrator) of the network monitor (107) to visualize received signal strength values, the user may adjust the locations and configurations of the APs (e.g., AP X (102X), AP Y (102Y)) of the system (100). For example, such adjustment may be made while the user views the RCH by itself, or views the RCH and a FCH side-by-side or overlapped. In particular, the user may specify the adjustment to selectively minimize the interference from objects in the physical environment, or to contain anomalous behavior of a client device. Accordingly, such adjustment may improve the results of device purchase planning, deployment planning, channel/transmission power planning, and/or interference mitigation of the system (100) servicing the physical environment.

In one or more embodiments, each of the network monitor (107), the controller (108), and the server (109) may correspond to a computing system or execute on a computing system and cause the computing system to perform the functionalities of the network monitor (107), the controller (108), or the server (109). An example of the computing system is described in reference to FIG. 4 below. Although shown as separated from the server (109), in one or more embodiments, the network monitor (107) may be integrated with the server (109).

While FIG. 1 shows a configuration of components, other configurations may be used without departing from the scope of the claims. For example, various components may be combined to create a single component. As another example, the functionality performed by a single component may be performed by two or more components.

Figure 2:
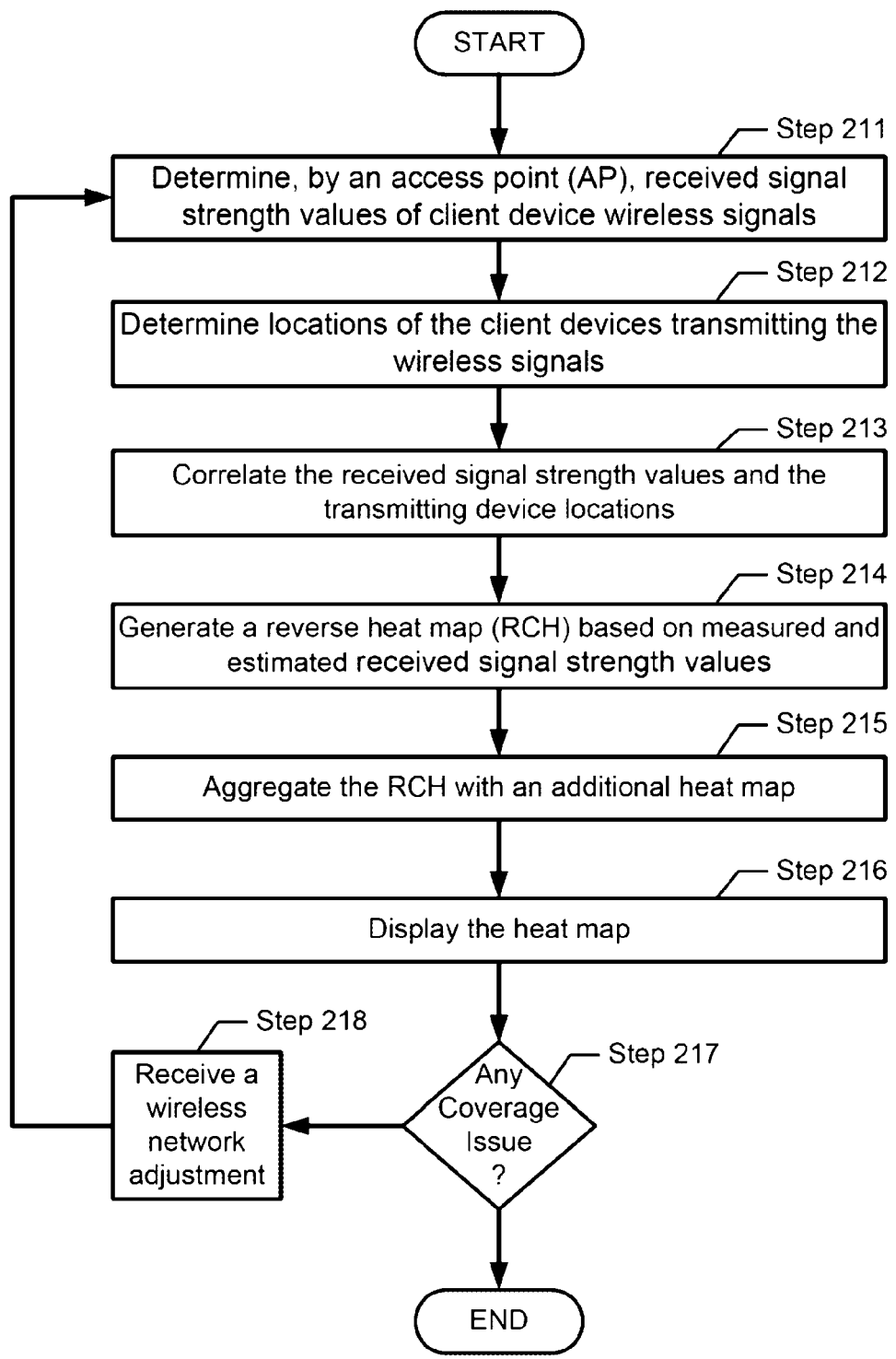
FIG. 2 shows a flow chart of a method in accordance with one or more embodiments.

FIG. 2 shows a method flow chart in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially, in Step 211, received signal strengths, for wireless signals received by an access point (AP) located in a physical environment, are measured to generate received signal strength measurements. In one or more embodiments, the wireless signals are received via a radio frequency (RF) antenna of the AP. Accordingly, the received signal strengths are measured by an electronic circuit of the AP, referred to as a radio of the AP. The received signal strength measurements, or normalized versions of the signal strength measurements include numerical values that are referred to as received signal strength values. In one or more embodiments, the wireless signal includes metadata identifying the transmitting device, which may be a client device, or another AP in the physical environment. For example, a radio-based mac address of the transmitting device may be extracted from the wireless signal to identify the transmitting device. Accordingly, the received signal strength values generated by the AP may be organized into a list of received signal strength data tuples, where each received signal strength data tuple includes a received signal strength value of the wireless signal, the identifier of the transmitting device transmitting the wireless signal, and a signal receiving timestamp corresponding to the time when the wireless signal is received by the AP. In one or more embodiments, each received signal strength data tuple is constructed based on information of an eligible mac frame of the wireless signal. In other words, the eligible mac frames are identified from the wireless signals for generating the list of data tuples. A mac frame is a collection of data packets whose format is defined by the wireless protocol used by the AP and connected client devices. The eligible mac frame is a mac frame whose measured signal strength satisfies a pre-determined precision and accuracy criterion compared to other mac frames. For instance, eligible mac frames may be identified by the AP and referred to as probe reports.

In one or more embodiments, the received signal strength values are normalized values based on a transmission power specification of the transmitting devices. For example, the received signal strength value in each received signal strength data tuple may be a ratio of a received signal strength measurement to the transmission power specification of the transmitting device. Specifically, the type and model of the transmitting device may be identified by the radio based mac address in the received signal strength data tuple. Accordingly, the corresponding transmission power specification may be obtained for normalizing the received signal strength values.

In one or more embodiments, the wireless signals received by the AP include a portion that is transmitted from client devices of different types, and another portion that is transmitted from other APs in the physical environment. Accordingly, the corresponding received signal strength values may be normalized based on the respective transmission power specifications.

In Step 212, a number of locations referred to as transmitting device locations) are determined from where the wireless signals were transmitted. Specifically, a location is determined for each wireless signal received and measured by the AP. For example, the locations may include locations of the client devices and locations of other APs in the physical environment. In one or more embodiments, the locations of the client devices are determined using the client location analyzers described above. Because the locations of the client devices may change over time, each client device location is associated with a location determination timestamp corresponding to the time when the location is determined. In one or more embodiments, the location information is organized into a list of transmitting device location data tuples, where each transmitting device location data tuple includes a 2D or 3D geographical location of a transmitting device, a radio based mac address of the transmitting device, and location determination timestamp if applicable.

In Step 213, the received signal strength values and the transmitting device locations are correlated. In one or more embodiments, the list of received signal strength data tuples and the list of transmitting device location data tuples are compared to identify pairs of received signal strength data tuple and transmitting device location data tuple, where the signal receiving timestamp and the location determination timestamp in each pair are within a pre-determined time window of each other. For example, the pre-determined time window may be set at 5 minutes, where the signal receiving timestamp and the location determination timestamp may be "13:00. Apr. 1, 2014 PST" and "13:04. Apr. 1, 2014 PST", respectively. Accordingly, the received signal strength value and the transmitting device location in each pair are correlated and used as a measurement data point (i.e., a direct measurement) for generating a reverse heat map (RCH).

In Step 214, the RCH is generated for the physical environment. In one or more embodiments, the measurement data points of the received signal strength values and the corresponding transmitting device locations are used as input to a calculus mechanism that generates a continuous contour map. Specifically, the calculus mechanism is a software or hardware component that estimates received signal strength values for additional locations where direct measurements of received signal strength values are not available in the physical environment. For example, the calculus mechanism may be configured to perform data interpolation and/or extrapolation based on the direct measurements. Accordingly, the continuous contour map is generated based on the directly measured received signal strength values, as well as the estimated received signal strength values that are interpolated and/or extrapolated from the direct measurements.

In one or more embodiments, the RCH is generated by defining a number of zones based on a collection of measurement data points that are results of the correlation performed in Step 213 above. Specifically, a particular zone is defined by identifying at least one contour using locations of one or more transmitting devices that transmitted wireless signals which were received by the AP at a particular received signal strength value. Further, a zone may be bounded by two contours that are defined by a received signal strength range.

In Step 215, the RCH is optionally aggregated with another heat map. For example, the RCH may be aggregated with a previous RCH of the same physical environment that was generated at a previous time. In another example, the RCH may be aggregated with a FCH of the same physical environment. In one or more embodiments, the RCH is aggregated with another heat map in response to a request from a user. For example, the request may be received from the user via a GUI of the help desk described in reference to FIG. 1 above. In one or more embodiments, the RCH and another heat map are normalized before being aggregated. In one or more embodiments, the aggregation is based on a lower received signal strength value between corresponding points in the RCH and another heat map. An example of aggregating heat maps is described in reference to FIG. 3.2 below.

In Step 216, the heat map is displayed. For example, the RCH generated in Step 214, or the aggregated heat map generated in Step 215 may be displayed using the GUI of the help desk described in reference to FIG. 1 above. For example, the heat map may be displayed in a display window of the GUI.

In Step 217, a determination is made as to whether the heat map indicates any wireless signal coverage issue. In one or more embodiments, a wireless signal coverage issue may be identified by a user viewing the displayed heat map in the display window of the GUI. In one or more embodiments, a wireless signal coverage issue may be automatically detected by analyzing the heat map prior to, or even without the heat map being displayed to any user. For example, the heat map may be analyzed using a computerized pattern recognition algorithm to detect a pre-determined pattern indicating a known type of wireless signal coverage issue. Accordingly, the detected wireless signal coverage issue is presented to the user. In one or more embodiments, as recommendation to alleviate the detected wireless signal coverage issue is also presented to the user. For example, the recommendation may be selected from a problem-solution database based on the detected wireless signal coverage issue.

If the determination in Step 217 is positive, i.e., the heat map does indicate a wireless signal coverage issue, the method proceeds to Step 218. If the determination in Step 217 is negative, i.e., the heat nap does not indicate any wireless signal coverage issue, the method ends.

In Step 218, an adjustment of the wireless network is received. For example, the adjustment may specify certain changes in the locations or configurations of the APs in the physical environment, and/or changes in other aspects (e.g., physical layout) of the floor plan. The adjustment may also specify additional APs to be added to service the physical environment. In one or more embodiments, such adjustment may include activating a dynamic cell size control functionality and/or an asymmetric Tx/Rx cell size configuration. The cell size is the size of a physical area (referred to as a RF cell) where the signal strength at any location at the boundary is the same and at a pre-determined level. The Tx cell is a RF cell based on signal strengths measured in Tx (i.e., transmitting) direction, where the transmitter is at the center of the RF cell. The Rx cell is a RF cell based on signal strengths measured in Rx (i.e., receiving) direction, where the receiver antenna is at the center of the RF cell. "Dynamic cell size control" refers to dynamically controling Tx cell size and/or Rx cell size by adjusting Tx power and/or Rx sensitivity. "Asymmetric Tx/Rx cell size" refers to the configuration where the Tx cell size is not equal to the Rx cell size.

In one or more embodiments, the adjustment is specified by the user in response to viewing the displayed heat map. In one or more embodiments, the adjustment is heuristically determined according to the automatically generated recommendation. Once the adjustment is implemented, the method returns to Step 211.

FIG. 3.3 shows an example of aggregating two heat maps in accordance with one or more embodiments. In one or more embodiments of the invention, the example shown in FIG. 3.3 may be practiced using the system (100) and the method flow chart described in reference to FIG. 2, respectively. In particular, the example screenshots shown in FIG. 3.3 may be generated by the network view generator (107x) for presenting to users of the network monitor (107).

FIG. 3.3 shows a screenshot C (311) of a heat map A (312), a screenshot D (321) of a heat map B (322), and a screenshot F (331) of an aggregate heat map (332). In particular, the aggregate heat map (332) is generated by aggregating the heat map A (312) and the heat map B (322). In one or more embodiments, the heat map A (312), the heat map B (322), and the aggregate heat map (332) are based on the same floor plan (122) as the FCH and RCH shown in FIGS. 3.1 and 3.2 above. Specifically, the heat map A (312) is a FCH showing received signal strength values of wireless signals that are transmitted from the AP1 (123) and received by client devices at various locations throughout the physical environment. In contrast, the heat map B (322) is a RCH showing received signal strength values of wireless signals that are received by the AP1 (123) and transmitted from client devices at various locations throughout the physical environment.

Further as shown in FIG. 3.3, each of the heat map A (312), the heat map B (322), and the aggregate heat map (332) are gridded into a matrix of grid cells, where each grid cell corresponds to a point in the heat map and represents a corresponding location in the physical environment. In particular, only a portion of each grid matrix is shown in FIG. 3.3 for clarity. For example, the grid cell A (313), the grid cell B (323), and the grid cell C (333) are shown in the heat map A (312), the heat map B (322), and the aggregate heat map (332), respectively. Specifically, the grid cell A (313), the grid cell B (323), and the grid cell C (333) correspond to the same location in the physical environment. Initially, the grid cells of the screenshot E (331) are not assigned any values. When generating the aggregated heat map, the received signal strength values of the grid cell A (313) (i.e., −65 dBm) and grid cell B (323) (i.e., −69 dBm) are compared to select the lower value for assigning to the grid cell C (333). Accordingly, the aggregated received signal strength value of the grid cell C (333) is set to −69 dBm. Similarly, the rest of the grid cells of the aggregated heat map are populated with lower values between the heat map A (312) and the heat map B (322), on a grid cell by grid cell basis. Once all the grid cells in the aggregated heat map are populated, iso-value curves are identified as contours in the aggregated heat map.

Figure 4:
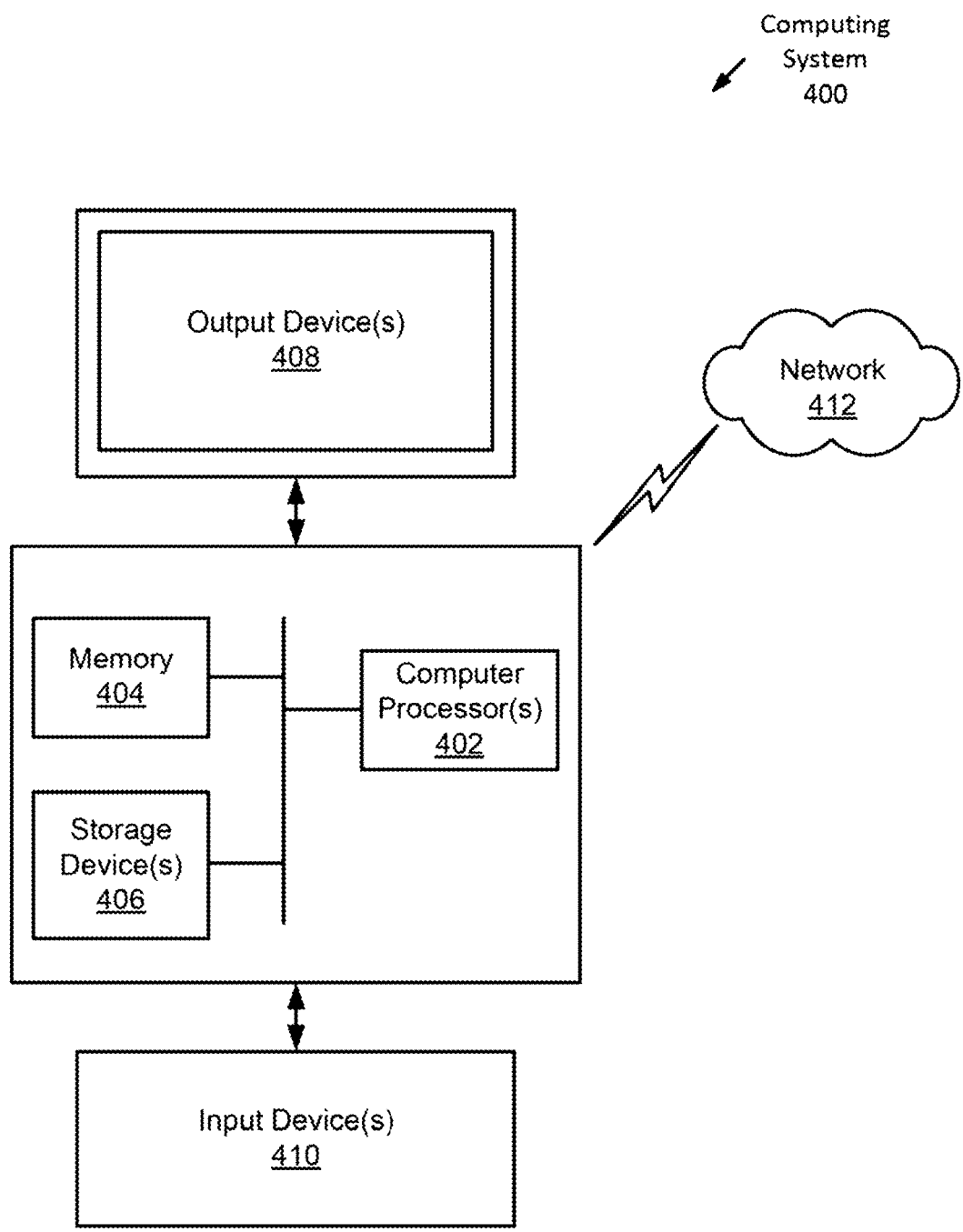
FIG. 4 shows a computer system in accordance with one or more embodiments.

Embodiments may be implemented on virtually any type of computing system regardless of the platform being used. For example, the computing system may be one or more mobile devices (for example, laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 4, the computing system (400) may include one or more computer processor(s) (402), associated memory (404) (for example, random access memory (RAM), cache memory, flash memory, etc.), one or more storage device(s) (406) (for example, a hard disk, an optical drive such as a compact disk (CD) chive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (for example, a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (for example, a local area network (LAN), a wide area network (WAN) such as the Internet, mobile network, or any other type of network) via a network interface connection (not shown). The input and output device(s) may be locally or remotely (for example, via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (400) may be located at a remote location and connected to the other elements over a network (412). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While embodiments have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A non-transitory computer readable medium comprising instructions which, when executed by a processor, cause the processor to:
   determine, for a plurality of wireless signals received by an access point located in a physical environment:
      a corresponding plurality of received signal strength values; and
      a corresponding plurality of locations from where the plurality of wireless signals were transmitted; and
   generate a reverse heat map for the physical environment such that each of a plurality of zones for the access point in the reverse heat map are defined based on:
      the corresponding plurality of received signal strength values;
      the corresponding plurality of locations determined for the plurality of wireless signals; and
      a plurality of contours for the access point determined based on the received signal strength values and the plurality of locations.

2. The non-transitory computer readable medium of claim 1, wherein the instructions to generate the reverse heat map comprises instructions which, when executed by the processor, cause the processor to define at least two contours of a particular zone, wherein:
   a first contour among the plurality of contours of the particular zone corresponds to a first received strength value among the plurality of received signal strength values; and
   a second contour among the plurality of contours of the particular zone corresponds to a second received strength value among the plurality of received signal strength values.

3. The non-transitory computer readable medium of claim 1, further including instructions which, when executed by the processor, cause the processor to:
   define a first contour among the plurality of contours, for a particular zone, using locations of one or more transmitting devices that transmitted wireless signals which were received by the access point at a first received signal strength value.

4. The non-transitory computer readable medium of claim 1, further including instructions which, when executed by the processor, cause the processor to:
   define each of the plurality of zones using a received signal strength value or a received signal strength range.

5. The non-transitory computer readable medium of claim 1, wherein:
   the plurality of wireless signals comprise a first portion transmitted from a plurality of client devices of a first type and a second portion transmitted from a plurality of client devices of a second type, and the instructions to generate the reverse heat map include instructions which, when executed by the processor, cause the processor to:
   generate a first reverse heat map based on the first portion and generate a second reverse heat map based on the second portion.

6. The non-transitory computer readable medium of claim 5, wherein the instructions to generate the reverse heat map further comprise instructions to:
   normalize the first reverse heat map to generate a first normalized reverse heat map based on a first transmission power specification of the plurality of client devices of the first type;
   normalize the second reverse heat map to generate a second normalized reverse heat map based on a second transmission power specification of the plurality of client devices of the second type; and
   aggregate the first normalized reverse heat map and the second normalized reverse heat map.

7. The non-transitory computer readable medium of claim 6, wherein the instructions to aggregate the first normalized reverse heat map and the second normalized heat map include instructions to:
   aggregate the first normalized reverse heat map and the second normalized reverse heat map based on a lower received signal strength value between the first normalized reverse heat map and the second normalized reverse heat map.

8. The non-transitory computer readable medium of claim 1, further comprising instructions which, when executed by the processor, cause the processor to:
   generate a forward heat map; and
   aggregate the forward heat map and the reverse heat map.

9. A non-transitory computer readable medium comprising instructions which, when executed by a processor, causes the processor to:
  determine, for a plurality of wireless signals received by an access point located in a physical environment:
    a corresponding plurality of received signal strength values; and
    a corresponding plurality of locations from where the plurality of wireless signals were transmitted;
  determine a plurality of contours for the access point in the physical environment based on the received signal strength values and the plurality of locations;
  generate a reverse heat map based on the received signal strength values, the plurality of locations, and the plurality of contours; and
  estimate a mapping between:
    locations in the physical environment; and
    an estimate of received signal strength values for wireless signals transmitted from the respective locations in the physical environment and received at the access point.

10. The non-transitory computer readable medium of claim 9, wherein the reverse heat map comprises a plurality of zones, and wherein the instructions to estimate the mapping include instructions which, when executed by the processor, cause the processor to:
  define at least two contours of a particular zone among the plurality of zones, wherein:
    a first contour of the particular zone corresponds to a first received strength value; and
    a second contour of the particular zone corresponds to a second received strength value.

11. The non-transitory computer readable medium of claim 9, wherein the instructions to determine the plurality of contours includes instructions to determine a first contour of a particular zone using locations of one or more transmitting devices that transmitted wireless signals which were received by the access point at a first received signal strength value.

12. The non-transitory computer readable medium of claim 10, including instructions which, when executed by the processor, cause the processor to:
  define each of the plurality of zones using a received signal strength value or a received signal strength range.

13. The non-transitory computer readable medium of claim 9,
  wherein the plurality of wireless signals are transmitted from a single client device at a plurality of time points.

14. The non-transitory computer readable medium of claim 9,
  wherein the plurality of wireless signals comprise a first portion transmitted from a plurality of client devices of a first type and a second portion transmitted from a plurality of client devices of a second type, and
  wherein the instructions to generate the reverse heat map comprises instructions to generate a first reverse heat map based on the first portion and generate a second reverse heat map based on the second portion.

15. The non-transitory computer readable medium of claim 14, wherein the instructions to generate the reverse heat map further comprise instructions which, when executed by the processor, cause the processor to:
  normalize the first reverse heat map to generate a first normalized reverse heat map based on a first transmission power specification of the plurality of client devices of the first type;
  normalize the second reverse heat map to generate a second normalized reverse heat map based on a second transmission power specification of the plurality of client devices of the second type; and
  aggregate the first normalized reverse heat map and the second normalized reverse heat map.

16. The non-transitory computer readable medium of claim 15, wherein the instructions to aggregate the first normalized reverse heat map and the second normalized heat map include instructions to:
  aggregate the first normalized reverse heat map and the second normalized reverse heat map based on a lower received signal strength value between the first normalized reverse heat map and the second normalized reverse heat map.

17. The non-transitory computer readable medium of claim 9, further comprising instructions which, when executed by the processor, cause the processor to:
  generate a forward heat map; and
  aggregate the forward heat map and the reverse heat map.

18. A graphical user interface (GUI) comprising a heat map of a physical environment, the heat map comprising:
  a representation of an access point (AP) in the physical environment; and
  a plurality of zones for the AP, each zone being defined by at least two contours for the AP comprising:
    a first contour corresponding to a first received signal strength value; and
    a second contour corresponding to a second received signal strength value, wherein the first contour is determined using at least:
    a first location of a transmitting device, in the physical environment, that transmitted a first wireless signals which was received by the AP at the first received signal strength value; and
    a second location of the transmitting device, in the physical environment, that transmitted a second wireless signals which was received by the AP at the first received signal strength value.

19. The GUI of claim 18, wherein the transmitting device comprise one of a second AP and a client device.

* * * * *